(12) United States Patent
Schnurr (10) Patent No.: US 10,495,207 B2
(45) Date of Patent: Dec. 3, 2019

(54) GEARBOX HOUSING, GEARBOX UNIT WITH SUCH A GEARBOX HOUSING AND GEAR MOTOR WITH SUCH A GEARBOX UNIT

(71) Applicant: SIEMENS AKTIENGESELLSCHAFT, München (DE)

(72) Inventor: Wolfgang Schnurr, Nehren (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 1085 days.

(21) Appl. No.: 14/376,705

(22) PCT Filed: Jan. 17, 2013

(86) PCT No.: PCT/EP2013/050809
§ 371 (c)(1),
(2) Date: Aug. 5, 2014

(87) PCT Pub. No.: WO2013/117397
PCT Pub. Date: Aug. 15, 2013

(65) Prior Publication Data
US 2015/0007691 A1    Jan. 8, 2015

(30) Foreign Application Priority Data

Feb. 6, 2012   (EP) ..................... 12154054

(51) Int. Cl.
*F16H 57/02*    (2012.01)
*F16H 57/027*   (2012.01)
(Continued)

(52) U.S. Cl.
CPC .......... *F16H 57/02* (2013.01); *F16H 57/027* (2013.01); *F16H 57/0408* (2013.01);
(Continued)

(58) Field of Classification Search
CPC ............. F16H 57/027; F16H 57/0408; F16H 57/0421; F16H 57/0424; F16H 57/0447;
(Continued)

(56) References Cited

U.S. PATENT DOCUMENTS 2,536,385 A    1/1951  Miller
2,750,806 A *  6/1956  Hobbs ................. F16H 1/14
                                                165/47
(Continued)

FOREIGN PATENT DOCUMENTS

CN    201599394 U   10/2010
CN    102305284 A    1/2012
(Continued)

OTHER PUBLICATIONS

EPO Translation of DE 102009005346 A1, Bender et al., Jul. 22, 2010. (Year: 2018).*

(Continued)

*Primary Examiner* — Daniel D Yabut
(74) *Attorney, Agent, or Firm* — Henry M. Feiereisen LLC (57) ABSTRACT

A gearbox housing includes a housing body enclosing a housing interior and having a passage opening for a gearbox output shaft surrounded by a connecting surface. A plurality of bores is formed in the housing body and extends through the housing body wall to fill oil into or drain it out of the housing interior, detect the oil level in the housing interior and vent the housing interior. The bores, which are provided as an oil filling opening, an oil draining opening, a venting opening and a level measuring opening during operation, are positioned in such a manner that they can be introduced into the housing body from two adjacent housing sides. This enables machining with a single clamping, with the result (Continued)

that changeover times are unnecessary and the housing body is consequently easy to manufacture.

18 Claims, 5 Drawing Sheets

(51) Int. Cl.
*F16H 57/04* (2010.01)
*F16H 57/031* (2012.01)

(52) U.S. Cl.
CPC ..... *F16H 57/0447* (2013.01); *F16H 57/0449* (2013.01); *F16H 57/031* (2013.01); *Y10T 74/2186* (2015.01)

(58) Field of Classification Search
CPC ............... F16H 57/0449; F16H 57/033; F16H 2057/0335; F16H 1/16; F01M 11/0458; F01M 2011/0441; F01M 2011/0416
See application file for complete search history.

(56) References Cited

U.S. PATENT DOCUMENTS

| | | | |
|---|---|---|---|
| 3,486,207 A * | 12/1969 | Polzin | F16H 1/20 29/407.1 |
| 3,521,503 A * | 7/1970 | Helmut | F16H 1/16 74/606 R |
| 3,521,504 A | 7/1970 | Helmut | |
| 5,911,793 A | 6/1999 | Kaye | |
| 6,082,221 A | 7/2000 | Boeing et al. | |
| 8,176,806 B2 | 5/2012 | Boeing et al. | |
| 8,585,292 B2 | 11/2013 | Boeing et al. | |
| 2007/0205113 A1 * | 9/2007 | Leite da Silva | F16H 57/0408 205/688 |
| 2009/0133521 A1 | 5/2009 | Kunert et al. | |
| 2013/0125687 A1 | 5/2013 | Allgaier et al. | |

FOREIGN PATENT DOCUMENTS

| | | |
|---|---|---|
| CN | 102312996 A | 1/2012 |
| DE | 3321864 A1 | 12/1981 |
| DE | 10 2009 005 346 A1 | 7/2010 |
| DE | 10 2009 005 349 A1 | 7/2010 |
| JP | 52013272 U | 1/1977 |

OTHER PUBLICATIONS

SEW-Eurodrive, Betriebsanleitung für Getriebe Typenreihen R..7, F..7, K..7, S..7, Spiroplan W, Ausgabe May 2004, pp. 1-92; 2004.
SEW-Eurochve, Montage—und Betriebsanleitung, Getriebe Typenreihen R..7, F..7, K..7, S..7, Spiropian W, Ausgabe Jun. 2010 online abrufbar unter http://download.sew-eurodrive.com/download/pdf/16970403.pdf; 2010.
Ausdruck der internetseite archive.org bzgl. der URL http://download.sew-eurodrive.com/download/pdf/16970403.pdf vom Jul. 5, 2017; p. 1; 2016.
Seweurodrive et al; Ausdruck der Internetseite archive.org bzgl, der URL https://web.archive.org/web/20101115000000*/http://www.sew-eurodrive.de/download/pdf/16970403.pdf.
Lenze: "Geared motors", G-motion const; pp. 1-814; Jul. 2006.
Flender Tübingen GmbH: "Operating Instructions", BA 2010 EN 05.04, MOTOX-N, Gear Units; pp. 1-90; 2010.

* cited by examiner

GEARBOX HOUSING, GEARBOX UNIT WITH SUCH A GEARBOX HOUSING AND GEAR MOTOR WITH SUCH A GEARBOX UNIT

CROSS-REFERENCES TO RELATED APPLICATIONS

This application is the U.S. National Stage of International Application No. PCT/EP2013/050809, filed Jan. 17, 2013, which designated the United States and has been published as International Publication No. WO 2013/117397 and which claims the priority of European Patent Application, Ser. No. 12154054.6, filed Feb. 6, 2012, pursuant to 35 U.S.C. 119(a)-(d).

BACKGROUND OF THE INVENTION

The invention relates to a gearbox housing comprising a housing body enclosing a housing interior and having a passage opening for a shaft surrounded by a connecting surface, wherein a plurality of bores formed in the housing body and passing through the housing body wall are used to fill oil into or to drain it out of the housing interior, detect the oil level in the housing interior and vent the housing interior. The invention further relates to a gearbox unit and a gear motor which are provided with such a gearbox housing.

Gear motors are known in various embodiments and form a combined unit consisting of a motor, generally an electric motor, and a reduction gear which ensures that the output shaft of the gearbox rotates at a lower speed but at a substantially higher torque than that of the motor. So-called MOTOX standard gear motors, for example, are available from the applicant and are able to be supplied with helical gear units, offset shaft gear units and helical-bevel gear units for a power range of up to 200 kW and a gear unit torque of up to 20,000 Nm. Gear motors comprising planetary gear units are also available.

Gear motors are used in the prior art, for example as actuating drives for motors, feed drives on machines as well as drives for robots, windshield wipers, etc. The gearbox housing is provided in this case with a connecting surface, generally a standard flange via which it may be connected to the shaft to be driven.

The gearbox units of the gear motors have to be lubricated during operation. To this end, the interior of the gearbox housing is filled with oil to a predetermined level. Accordingly, bores are provided in the housing wall of the gearbox housing, said bores functioning during operation as an oil filling opening, an oil draining opening, a venting opening and as a level measuring opening in the gearbox housing. In this case, the bores are provided in such a number and positioned such that the aforementioned functions are fulfilled, even in different installed positions. This requires costly machining in some cases, however, as the gearbox housing has to be repeatedly reclamped and positioned in order to introduce the bores.

SUMMARY OF THE INVENTION

It is, therefore, the object of the present invention to specify a gearbox housing and a gearbox unit and a gear motor which may be produced in a simple manner.

This object is achieved according to the invention by the bores being introduced into the housing body from two machining sides, wherein a first group of at least two bores is introduced into the housing body from one housing side and distributed around the connecting surface, and a second group comprising the remaining bores is introduced into the housing body from a second housing side adjacent to the first housing side.

The invention is based on the consideration that the bores which are provided as an oil filling opening, an oil draining opening, a venting opening and a level measuring opening during operation, are positioned such that they may be introduced into the housing body from two adjacent housing sides. This enables machining with a single clamping process, with the result that changeover times are unnecessary and the housing body is consequently easy to manufacture.

According to one embodiment of the invention, it is provided in this case that the bores of the first group extend parallel to one another and, in particular, perpendicular to the plane which is spanned by the connecting surface. By means of their parallel alignment, the bores may be produced in one operation and by means of the alignment relative to the connecting surface, the bores of the first group and the connecting surface may be produced without having to re-adjust the machine tool between the operations.

Similarly, the bores of the second group may extend parallel to one another, wherein said bores are then expediently aligned parallel to the plane of the connecting surface and thus perpendicular to the bores of the first group, so that the machining planes for the two groups of bores are perpendicular to one another and also the connecting surface is parallel to the one machining plane and perpendicular to the other machining plane, whereby the machining is further simplified.

In a further embodiment of the present invention, it is provided that the first group of bores comprises a total of two bores and the second group of bores comprises a total of three bores, wherein the two bores of the first group are positioned such that the first bore is used for draining oil and the second bore is used for measuring the oil level, if the gearbox housing is aligned such that the connecting surface faces to the side and the bores of the second group are oriented upwardly. In this embodiment, oil may be drained from the housing interior and the oil level measured via the bores of the first group. The upwardly facing bores of the second group may be used in some cases in order to fill oil into the housing interior or to vent said housing interior.

Preferably, in this case the bores of the first group are positioned such that the first bore is used for venting and filling and the second bore is used for measuring the oil level if the gearbox housing is aligned such that the connecting surface faces to the side and the bores of the second group are oriented downwardly. In this case, the first bore of the first group has the dual function of filling the gearbox housing with oil and venting the gearbox housing, whilst the second bore is used for measuring the oil level. The downwardly oriented bores of the second group may be selectively used in order to drain oil from the gearbox housing.

Moreover, the two bores of the first group may be positioned such that the first bore is used for draining oil and the second bore is used for venting and filling, if the gearbox housing is aligned such that the connecting surface faces to the side and the bores of the second group face to the side. In this case, the oil level may be detected via the bore of the second group which is respectively located at the top.

So that the bores of the first group may fulfill the functions described above, they are preferably positioned on the outer edge of the housing interior, wherein the first bore adopts approximately a 7 o'clock position and the second bore adopts approximately a 4 o'clock position relative to the center of the passage opening for the gearbox output shaft, if the connecting surface is oriented to the side and the bores of the second group face upwardly.

According to one embodiment of the present invention, the bores of the second group are positioned such that, if the connecting surface is oriented upwardly, a first bore is used for draining oil and a second bore is used for measuring the oil level and, if the connecting surface is oriented downwardly, the first and/or the second bore is used for venting and filling and the third bore located between the first and second bores is used for measuring the oil level. In this case, the bores of the first group serve for filling and venting and/or draining oil.

Preferably, the three bores of the second group are arranged in the form of a triangle, wherein the first bore of the second group is located on the end region of the housing side into which it is introduced, remote from the connecting surface, the second bore is arranged on the end region of the housing side facing toward the connecting surface and the third bore is positioned in the direction of the gearbox axis between the first and second bores but laterally spaced apart therefrom.

BRIEF DESCRIPTION OF THE DRAWING

With regard to further advantageous embodiments of the invention, reference is made to the sub-claims and the following description of an exemplary embodiment with reference to the accompanying drawings, in which:

DETAILED DESCRIPTION OF PREFERRED EMBODIMENTS

A gearbox unit 1 according to the present invention is shown in the drawings, said gearbox unit forming part of a gear motor, not shown further. The gearbox unit 1 comprises a gearbox housing 2 with a housing body 3 which encompasses an interior in which a gearbox is accommodated. Only the end of the output shaft 4 of the gearbox, which protrudes from the gearbox housing 2, is visible in the drawings, the gearbox being able to be connected thereby to a unit to be driven. The axis X of the output shaft 4 also represents the gearbox axis X.

On its end region on the output side, the gearbox housing 2 also carries a connecting flange 5 via which the unit to be driven may be attached on the gearbox unit 1.

A passage opening 6 is provided in the gearbox housing 2, said passage opening opposing the output shaft 4 and the connecting flange 5, and an input and/or output shaft of a motor unit, not shown further, passing through said passage opening. The passage opening 6 is surrounded by a connecting surface 7 via which the motor unit may be connected to the gearbox unit 1.

The gearbox of the gearbox unit 1 has to be lubricated during operation. To this end, the interior of the gearbox housing 2 and/or the housing body 3 is filled with oil. Accordingly, a plurality of bores 8, 9, 10, 11, 12 are formed in the housing body 3, said bores passing through the housing body wall and during operation functioning as an oil filling opening, an oil draining opening, a venting opening as well as an opening measuring the oil level in the gearbox housing 2. The bores 8 to 12 are provided in this case in such a number and positioned such that the aforementioned functions are fulfilled in different installed positions.

Figure 1:
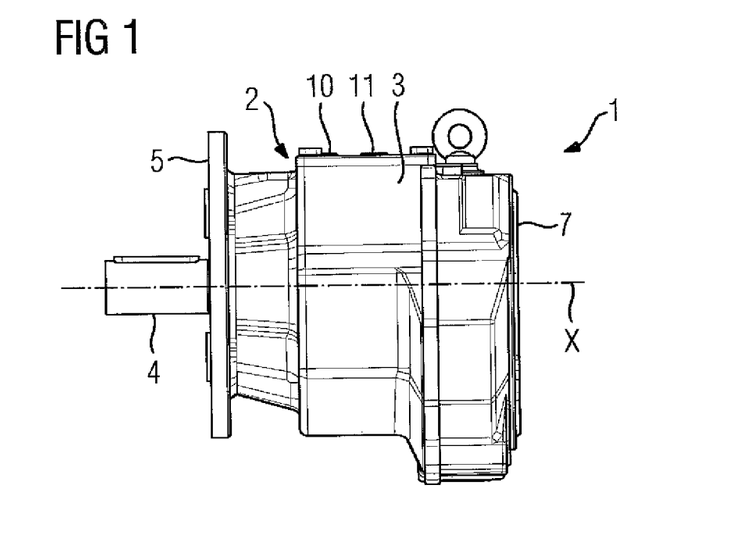
FIG. 1 shows a gearbox unit according to the present invention in a side view.
Figure 2:
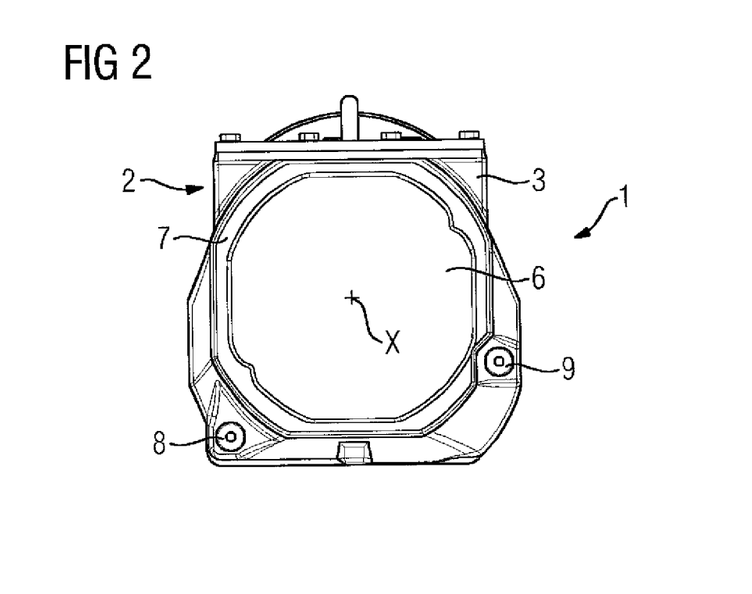
FIG. 2 shows the gearbox unit of FIG. 1 in a front view.

To this end, the bores 8 to 12 are introduced into the housing body from two machining sides, wherein a first group consisting of two bores 8, 9 is provided in the housing body 3 on the housing side on which the connecting surface 7 is located, and a second group with the remaining three bores 10, 11, 12 is provided in the housing body 3 on an adjacent housing side located at the top in FIGS. 1 and 2. In this case, the two bores 8, 9 of the first group are aligned perpendicular to a plane spanned by the connecting surface 7. The housing side in which the bores 10, 11, 12 of the second group are provided is located perpendicular to the connecting surface 7 and the bores 10, 11, 12 of the second group are introduced into the housing body 3 perpendicular to this housing side and extend through a mounting cover 3a mounted on the housing body 3.

It may be seen from FIG. 2 that the first group of bores 8, 9 is distributed around the connecting surface 7 and is positioned on the outer edge region of the housing body 3, so that the bores 8, 9 open into the housing interior on the outer edge thereof. In this case, the first bore 8 is positioned bottom left in FIG. 2 so that it adopts approximately a 7 o'clock position relative to the gearbox axis X and the second bore is positioned approximately in the 4 o'clock position relative to the gearbox axis X.

The bores 10, 11, 12 of the second group are positioned in the manner of a triangle, wherein the first bore 10 is located on the end region of the housing side into which it is introduced, remote from the connecting surface 7, the second bore 11 is arranged on the end region of the housing side facing the connecting surface 7, and the third bore 12 is positioned in the direction of the gearbox axis between the first and second bores 10, 11 but laterally spaced apart therefrom.

If, during operation, the gearbox unit 1 as shown in FIGS. 1 and 2 is aligned such that the connecting surface 7 faces to the side and the bores 10, 11, 12 of the second group are provided on the housing upper face, the first bore 8 of the first group is used as an oil draining opening and the second bore 9 is used to measure the filling level in the gearbox housing 2. The bores 10, 11, 12 of the second group may be selectively used in order to fill the gearbox housing 2 with oil and/or to vent the gearbox housing 2.

Figure 3:
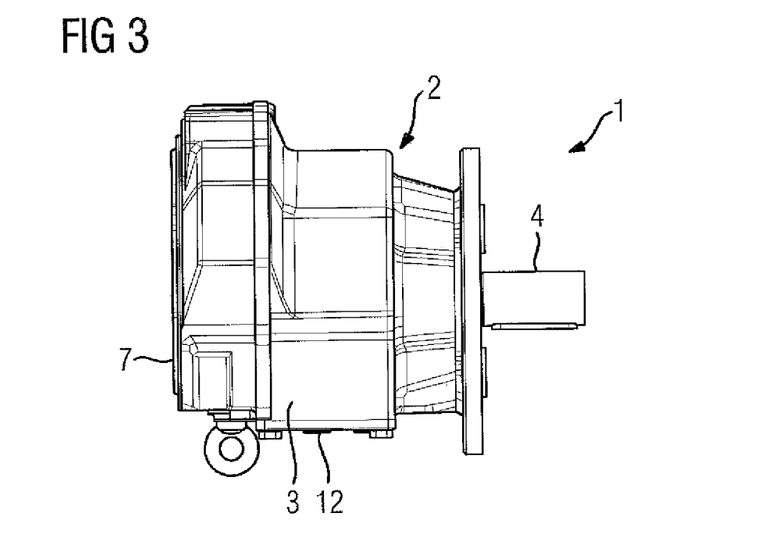
FIG. 3 shows the gearbox unit of FIGS. 1 and 2 in an installed position, rotated by 180° around the gearbox axis relative to FIG. 2, in a side view.
Figure 4:
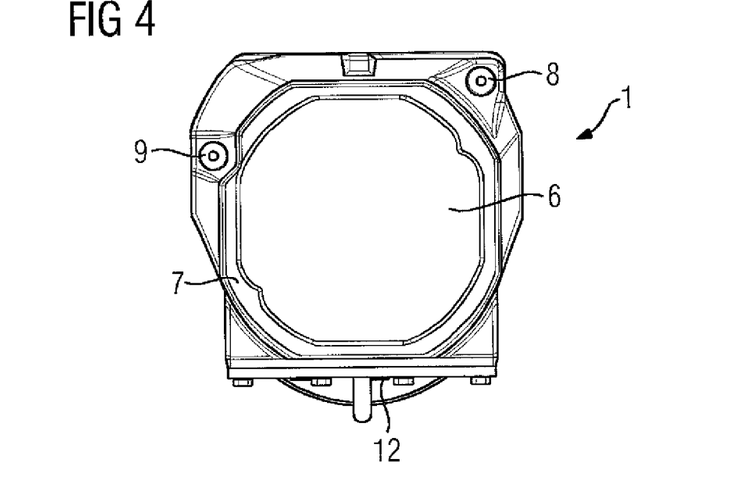
FIG. 4 shows the gearbox unit of FIG. 3 in a front view.

If the gearbox unit 1 is inverted so that the connecting surface 7 faces to the side and the bores 10, 11, 12 of the second group are located on the housing lower face, as shown in FIGS. 3 and 4, the first bore 8 of the first group is used for filling and venting the gearbox housing 2 and the second bore 9 is used for measuring the oil level. The bores 10, 11, 12 of the second group may be selectively used in order to drain the oil out of the gearbox housing 2.

Figure 5:
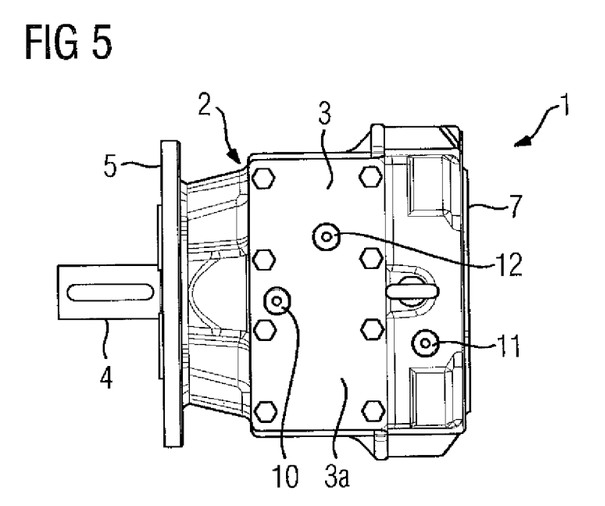
FIG. 5 shows the gearbox unit in an installed position, rotated by 90° counterclockwise relative to the installed position of FIG. 2, in a side view.
Figure 6:
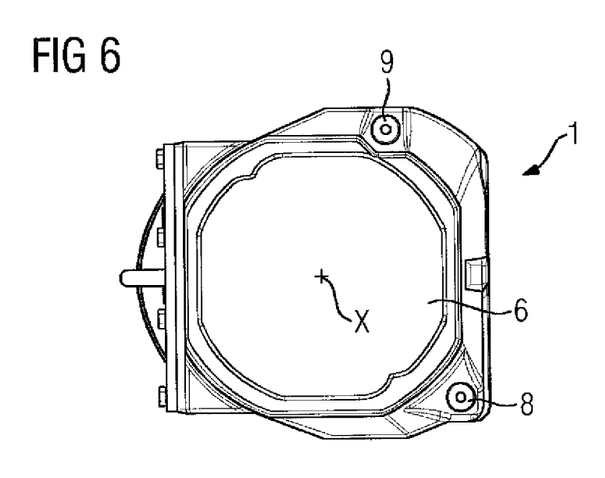
FIG. 6 shows the gearbox unit of FIG. 5 in a front view of the connecting surface.

In FIGS. 5 and 6, an installed position is shown in which the gearbox unit 1 is rotated relative to the position shown in FIGS. 1 and 2 by 90° around the gearbox axis X in the counterclockwise direction, so that the bores 10, 11, 12 of the second group face to the side. In this case, the second bore 9 of the first group located at the top is used for venting and filling the gearbox housing 2, the first bore 8 of the first group is used for draining oil and the first bore 10 of the second group located at the top is used for measuring the oil level. The second and third bores 11, 12 of the second group have no function here.

Figure 7:
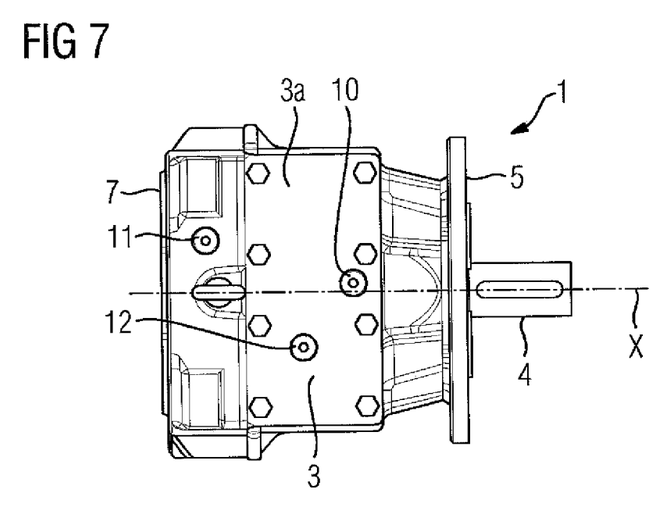
FIG. 7 shows the gearbox unit in an installed position, rotated by 90° clockwise around the gearbox axis relative to the installed position of FIG. 2, in a side view.
Figure 8:
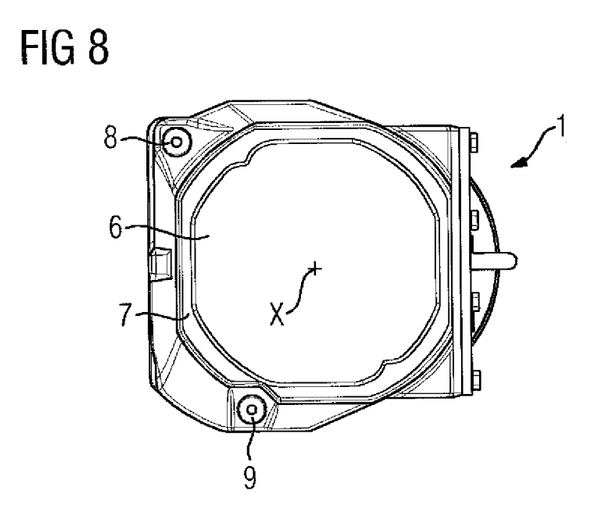
FIG. 8 shows the gearbox unit of FIG. 7 in a front view of the connecting surface.

If the gearbox unit 1 is used in an installed position, which is pivoted by 90° relative to the installed position shown in FIGS. 1 and 2 clockwise around the housing axis, as shown in FIGS. 7 and 8, the first bore 8 of the first group located at the top is used for filling and venting the gearbox housing 2 and the second bore 9 of the first group is used for draining oil, whilst the third bore 12 of the second group is used for measuring the oil level.

Figure 9:
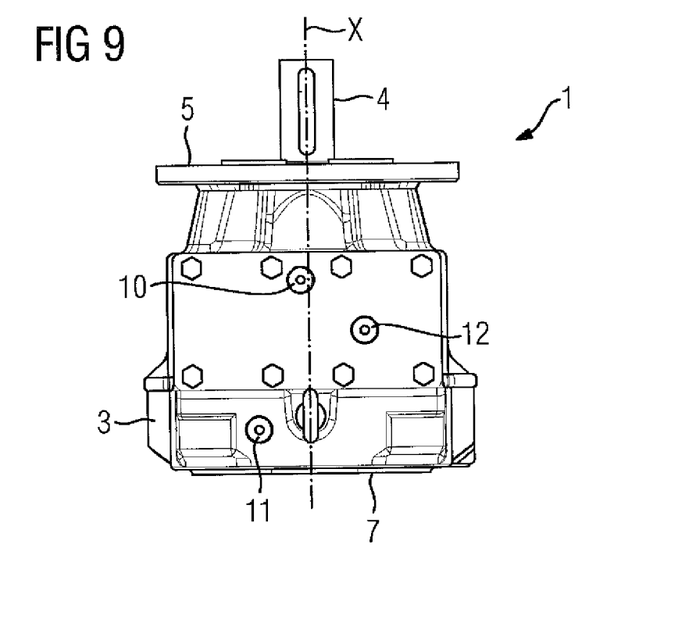
FIG. 9 shows the gearbox unit in an installed position in which the connecting surface is located at the bottom.

In FIG. 9, the gearbox unit 1 is shown in an installed position in which the connecting surface 7 faces downwardly. In this case, the first bore 10 of the second group located at the top is used for filling and venting the gearbox housing 2 and the third bore 12 of the second group located therebelow is used for measuring the oil level. The two downwardly oriented bores 8, 9 of the first group may be selectively used in order to drain oil from the gearbox housing 2.

Figure 10:
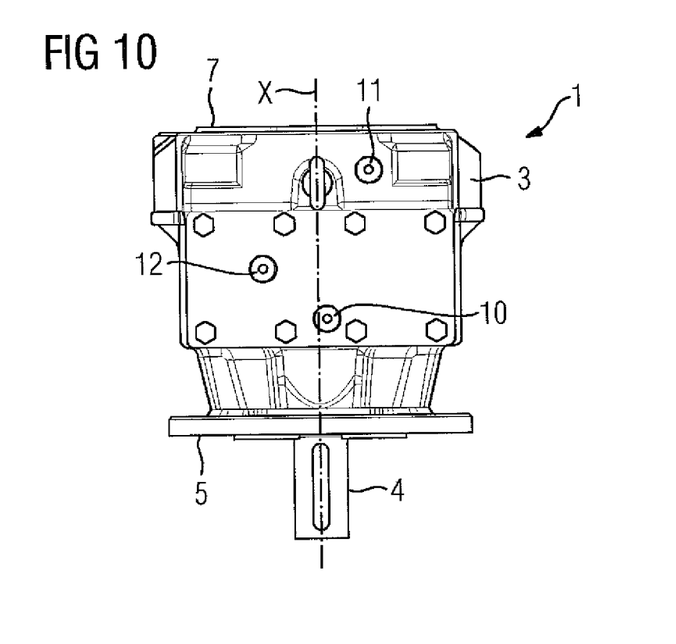
FIG. 10 shows the gearbox unit in an installed position in which the connecting surface faces upwardly.

In FIG. 10 the gearbox unit 1 is finally shown in an installed position in which the connecting surface 7 faces upwardly. In this case, the bores 8, 9 of the first group may selectively be used in order to fill the gearbox housing 2 with oil and/or vent the gearbox housing. The second bore 11 of the third group located at the top is used for measuring the oil level and the first bore 10 of the second group located at the bottom is used for draining oil.

All of the bores 8 to 12 are closed during operation and to this end may be configured as threaded bores, for example.

Whilst the invention has been illustrated and described more fully and in detail by the preferred exemplary embodiment, the invention is not limited by the disclosed examples and other variants may be derived therefrom by the person skilled in the art without departing from the protected scope of the invention.

The invention claimed is:

1. A gearbox housing for a gear motor, with the gearbox housing having an output shaft and constructed to enable filling oil into and draining oil from the gearbox as well as checking an oil level in a plurality of differently oriented mounting positions of the gearbox, the gearbox housing comprising:
a housing body enclosing a housing interior and having a passage opening for a shaft of the gear motor surrounded by a connecting surface at a side of the gearbox housing opposite the output shaft, a mounting cover mounted on the housing body, and a plurality of bores sized to extend through a housing body wall and provided to fill oil into or to drain oil from the housing interior, to detect an oil level in the housing interior and to vent the housing,
wherein a first group of the bores is introduced into the housing body from a first housing side, and a second group of the bores is introduced into the housing body from a second housing side adjacent and substantially perpendicular to the first housing side,
wherein in a particular of the plurality of mounting positions, one of the bores having a bottom position is designated an oil drain bore, another one of the bores having a top position is designated an oil fill bore, and one of the bores having an intermediate position is designated an oil detection bore, wherein the designation of the bores as oil drain bore, oil fill bore and oil detection bore is dependent on the particular mounting position,
wherein at least one of the second group of bores extends through the mounting cover,
wherein the bores of the second group of bores are positioned in one of two ways, a first way in which a first one of the bores of the second group of bores is used for draining oil and a second one of the bores of the second group of bores is used for measuring the oil level, when the connecting surface s oriented upwardly, a second way in which at least one of the first and second bores of the second group of bores is used for venting and filling and a third one of the, bores of the second group of bores is located between the first and second bores and used for measuring oil level, when the connecting surface is oriented downwardly.

2. The gearbox housing of claim 1, wherein the first group of bores has a total of two bores and the second group of bores has a total of three bores.

3. The gearbox housing of claim 1, wherein the bores of the first group of bores are positioned such that a first one of the bores of the first group of bores is used for draining oil and a second one of the bores of the first group of bores is used for measuring the oil level, when the gearbox housing is aligned such that the connecting surface faces to a side and the bores of the second group of bores are oriented upwardly.

4. The gearbox housing of claim 1, wherein the bores of the first group of bores are positioned such that a first one of the bores of the first group of bores is used for venting and filling oil into the housing interior, and a second one of the bores of the first group of bores is used for measuring the oil level, when the gearbox housing is aligned such that the connecting surface faces to a side and the bores of the second group of bores are oriented downwardly.

5. The gearbox housing of claim 1, wherein the bores of the first group of bores are positioned such that a first one of the bores of the first group of bores is used for draining oil out of the housing interior and a second one of the bores of the first group of bores is used for venting and filling oil into the housing interior, when the gearbox housing is aligned such that the connecting surface faces to a side and the bores of the second group of bores face to a side.

6. The gearbox housing of claim 1, wherein the first, second and third bores of the second group of bores are arranged in the form of a triangle, with the first bore of the second group of bores being located on a connecting-surface-distal end region of the second housing side into which it is introduced, with the second bore of the second group of bores being arranged on a connecting-surface-proximal end region of the second housing side, and with the third bore of the second group of bores being positioned in a direction of a gearbox axis between the first and second bores in laterally spaced-apart relationship.

7. A gearbox unit for a gear motor, comprising:
a gearbox housing having an output shaft, said gearbox housing including a housing body enclosing a housing interior and having a passage opening for a shaft of the gear motor surrounded by a connecting surface at a side of the gearbox housing opposite the output shaft, a mounting cover mounted on the housing body, and a plurality of bores sized to extend through a housing body wall and provided to fill oil into or to drain oil out of the housing interior, to detect an oil level in the housing interior and to vent the housing interior, wherein a first group of the bores is introduced into the housing body from a first housing side, and a second group of the bores is introduced into the housing body from a second housing side adjacent and substantially perpendicular to the first housing side, wherein the bores of the first group of bores extend parallel to one another and perpendicular to a plane which is spanned by the connecting surface, wherein the bores of the second group of bores extend parallel to one another and parallel to the plane of the connecting surface, wherein in a particular of the plurality of mounting positions, one of the bores having a bottom position is designated an oil drain bore, another one of the bores having a top position is designated an oil fill bore, and one of the bores having an intermediate position is designated an oil detection bore, wherein the designation of the bores as oil drain bore, oil fill bore and oil detection bore is dependent on the particular mounting position, wherein at least one of the second group of bores extends through the mounting cover, wherein the bores of the second group of bores are positioned in one of two ways, a first way in which a first one of the bores of the second group of bores is used for draining oil and a second one of the bores of the second group of bores is used for measuring the oil level, when the connecting surface is oriented upwardly, a second way in which at least of the first and second bores of the second group of bores is used for venting and filling and a third one of the bores of the second group of bores is located between the first and second bores and used for measuring the oil level when the connecting surface is oriented downwardly.

8. The gearbox unit of claim 7, wherein the first group of bores has a total of two bores and the second group of bores has a total of three bores.

9. The gearbox unit of claim 7, wherein the bores of the first group of bores are positioned such that a first one of the bores of the first group of bores is used for draining oil and a second one of the bores of the first group of bores is used for measuring the oil level, when the gearbox housing is aligned such that the connecting surface faces to a side and the bores of the second group of bores are oriented upwardly.

10. The gearbox unit of claim 7, wherein the bores of the first group of bores are positioned such that a first one of the bores of the first group of bores is used for venting and filling oil into the housing interior, and a second one of the bores of the first group of bores is used for measuring the oil level, when the gearbox housing is aligned such that the connecting surface faces to a side and the bores of the second group of bores are oriented downwardly.

11. The gearbox unit of claim 7, wherein the bores of the first group of bores are positioned such that a first one of the bores of the first group of bores is used for draining oil out of the housing interior and a second one of the bores of the first group of bores is used for venting and filling oil into the housing interior, when the gearbox housing is aligned such that the connecting surface faces to a side and the bores of the second group of bores face to a side.

12. The gearbox unit of claim 7, wherein the first, second and third bores of the second group of bores are arranged in the form of a triangle, with the first bore of the second group of bores being located on a connecting-surface-distal end region of the second housing side into which it is introduced, with the second bore of the second group of bores being arranged on a connecting-surface-proximal end region of the second housing side, and with the third bore of the second group of bores being positioned in a direction of a gearbox axis between the first and second bores in laterally spaced-apart relationship.

13. A gear motor, comprising:
a motor; and
a gearbox unit fixed to the motor and constructed to enable filling oil into and draining oil from the gearbox as well as checking an oil level in a plurality of differently oriented mounting positions of the gearbox, the gearbox unit having a gearbox housing with a housing body enclosing a housing interior and having a passage opening for a shaft of the motor surrounded by a connecting surface, a mounting cover mounted on the housing body, and an output shaft arranged on a side of the gearbox housing opposite the connecting surface, said housing body having a plurality of bores sized to extend through a housing body wall and provided to fill oil into or to drain oil out of the housing interior, to detect an oil level in the housing interior and to vent the housing interior, wherein a first group of the bores is introduced into the housing body from a first housing side, and a second group of the bores is introduced into the housing body from a second housing side adjacent and substantially perpendicular to the first housing side, wherein in a particular of the plurality of mounting positions, one of the bores having a bottom position is designated an oil drain bore, another one of the bores having a top position is designated an oil fill bore, and one of the bores having an intermediate position is designated an oil detection bore, wherein the designation of the bores as oil drain bore, oil fill bore and oil detection bore is dependent on the particular mounting position, wherein at least one of the second group of bores extends through the mounting cover, wherein the bores of the second group of bores are positioned in one of two ways, a first way in which a first one of the bores of the second group of bores is used for draining oil and a second one of the bores of the second group of bores is used for measuring the oil level, when the connecting surface is oriented upwardly, a second way in which at least one of the first and second bores of the second group of bores is used for venting and filling and a third one of the bores of the second group of bores is located between the first and second bored and used for measuring the oil level, when the connecting surface is oriented downwardly.

14. The gear motor of claim 13, wherein the first group of bores has a total of two bores and the second group of bores has a total of three bores.

15. The gear motor of claim 13, wherein the bores of the first group of bores are positioned such that a first one of the bores of the first group of bores is used for draining oil and a second one of the bores of the first group of bores is used for measuring the oil level, when the gearbox housing is aligned such that the connecting surface faces to a side and the bores of the second group of bores are oriented upwardly.

16. The gear motor of claim 13, wherein the bores of the first group of bores are positioned such that a first one of the bores of the first group of bores is used for venting and filling oil into the housing interior, and a second one of the bores of the first group of bores is used for measuring the oil level, when the gearbox housing is aligned such that the connecting surface faces to a side and the bores of the second group of bores are oriented downwardly.

17. The gear motor of claim 13, wherein the bores of the first group of bores are positioned such that a first one of the bores of the first group of bores is used for draining oil out of the housing interior and a second one of the bores of the first group of bores is used for venting and filling oil into the housing interior, when the gearbox housing is aligned such that the connecting surface faces to a side and the bores of the second group of bores face to a side.

18. The gear motor of claim 13, wherein the first, second and third bores of the second group of bores are arranged in the form of a triangle, with the first bore of the second group of bores being located on a connecting-surface-distal end region of the second housing &de into which it is introduced, with the second bore of the second group of bores being arranged on a connecting-surface-proximal end region of the second housing side, and with the third bore of the second group of bores being positioned in a direction of a gearbox axis between the first and second bores in laterally spaced-apart relationship.

* * * * *